CLEMENT F. HINMAN, OF CHICAGO, ILLINOIS.

*Letters Patent No. 84,119, dated November 17, 1868.*

IMPROVED COMPOSITION ROOFING.

The Schedule referred to in these Letters Patent and making part of the same.

*To all whom it may concern:*

Be it known that I, CLEMENT F. HINMAN, of the city of Chicago, in the county of Cook, and State of Illinois, have invented or discovered an Improved Composition for Roofing; and I hereby declare that the following is a full, clear, and exact description thereof, sufficient to enable those skilled in the art to make and use the same.

I am aware that numerous roofing-compositions are in use, but they are objectionable, for the reason that the material used is subject to evaporation or desiccation, and in time becomes quite hard, and liable to crack. Coal-tar, which is the principal ingredient in these compositions, contains a large amount of naphtha, which always evaporates, leaving only the resinous portion, which, in cold weather, becomes brittle; hence, the expansion and contraction of the roofing-boards, changes of temperature, settling of walls, chimneys, and other causes, produce cracks in these compositions, and roofs covered with them become leaky.

The object of my invention is to obviate the objections stated, and provide a roofing-composition which shall retain its elasticity for a long period, and under all ordinary circumstances; and to accomplish this object I use glycerine, oil, and dissolved India rubber, either separately or combined.

My composition is prepared as follows: To one barrel of coal-tar I add about two gallons of glycerine, about two quarts of lard-oil, or other suitable oil, and about three pints of dissolved rubber. When these have been thoroughly mixed, I add kaolin, or other clay, gypsum, decomposed feldspar, or other similar suitable substance, until the mixture has about the consistency of thick paint.

I use animal oil, because vegetable oils evaporate too rapidly.

It will not do to dispense with the glycerine and use only animal oil, for the reason that the quantity of oil which, in that case, would be required would interfere with the adhesive property of the composition. The quantity of oil hereinabove mentioned does not have any injurious effect. In fact, a small quantity of oil seems to render the coal-tar more adhesive.

The dissolved rubber has a tendency to gloss over and form a skin on the surface of the composition when applied, rendering it more impervious to water, and aiding in preventing evaporation.

I do not confine myself to the exact quantities or proportions of the glycerine, oil, and rubber mentioned, as the same may be somewhat varied without essentially changing the nature or quality of the composition.

The well-known non-evaporating property of glycerine renders my composition very durable, keeping it sufficiently soft and elastic for a long time.

My composition can be more readily prepared by first heating the coal-tar, and in use it may be applied with a brush to felting, paper, canvas, or otherwise, in the usual manner.

By using a greater quantity of glycerine, the oil may be dispensed with, and a good composition can be made, but I prefer to use a small quantity of oil, as stated, its effect being advantageous.

Having thus fully described my invention or discovery,

What I claim as new, and desire to secure by Letters Patent, is—

A roofing-composition, composed of coal-tar, clay, (or other similar suitable substance,) glycerine, and dissolved India rubber, either with or without animal oil, substantially as and for the purposes specified.

C. F. HINMAN.

Witnesses:
E. B. SHERMAN,
E. A. WEST.